United States Patent [19]
Lang et al.

[11] 3,859,214
[45] Jan. 7, 1975

[54] FILTRATION APPARATUS

[75] Inventors: Robert S. Lang; Robert L. Carnot, both of Tampa, Fla.

[73] Assignee: L. F. Lang & Son Pools, Inc., Tampa, Fla.

[22] Filed: Mar. 13, 1973

[21] Appl. No.: 340,671

[52] U.S. Cl................ 210/169, 210/323, 210/332
[51] Int. Cl............................................. E04h 3/16
[58] Field of Search................. 210/169, 198–200, 210/205, 206, 282, 323, 86, 424, 427, 60, 332

[56] References Cited
UNITED STATES PATENTS

| | | | |
|---|---|---|---|
| 2,693,882 | 11/1954 | Olson et al. | 210/323 |
| 3,365,064 | 1/1968 | Horan, Jr. | 210/169 |
| 3,481,470 | 12/1969 | Valois | 210/169 |
| 3,552,566 | 1/1971 | Lowe et al. | 210/86 |
| 3,581,895 | 6/1971 | Howard et al. | 210/169 |
| 3,653,513 | 4/1972 | Ortega et al. | 210/169 |
| 3,767,051 | 10/1973 | Thompson | 210/207 |

Primary Examiner—Theodore A. Granger
Attorney, Agent, or Firm—Oltman and Flynn

[57] ABSTRACT

Filtration apparatus particularly useful for filtering the water of a swimming pool by drawing the water through filter cartridges by vacuum. The apparatus may include a below grade filter tank, an above grade equipment package, special valves reaching below grade, and cleaning equipment for vacuuming the pool.

4 Claims, 8 Drawing Figures

FILTRATION APPARATUS

RELATED DISCLOSURE

Reference is made to Disclosure Document No. 007559 lodged on Nov. 3, 1971 in the U.S. Patent Office.

BACKGROUND OF THE INVENTION

This invention relates to a filtration apparatus for swimming pools.

Early swimming pools were filtered by flowing pool water through a large bed of fine sand by gravity. Later sand was confined within a pressurized vessel, and the water was forced through the sand bed in the vessel under pressure at a much higher rate than was possible with the gravity system. Later, the sand was replaced by diatomaceous earth which had capacities far exceeding sand, and made it possible to filter much more water with less equipment.

Research brought about the development of the vacuum diatomite filter for swimming pools. This concept employs the same technique of passing water through a layer of diatomaceous earth, but in the vacuum diatomite filter, water is drawn through the filter medium by vacuum, instead of being forced through the filter under pressure. This makes it possible for the filter element to be placed in an open tank, allowing easy visual inspection and positive cleaning.

One difficulty with the vacuum diatomite filter for swimming pools is that there is a waste disposal problem. In many areas there are severe limitations on the manner of disposing of waste water containing diatomaceous earth. This material is a pollutant which should not be simply dumped on the ground or into a body of water adjacent to the swimming pool; and because of its tendency to drift at fittings, it should not be introduced into sewer pipes.

Furthermore, vacuum systems in current use require both a main water recirculating pump and a separate additional pump for the specific purpose of vacuuming the pool. No sensible method has been devised to permit the circulating pump to accomplish both filtration and vacuuming, particularly in a relatively large system.

BRIEF DESCRIPTION OF THE INVENTION

Vacuum systems operate with lower water velocities, less turbulent water, and without the need for bulky, heavily constructed pressure filter equipment. Additionally, the filter tank serves as an accumulator pit receiving the flow of water from the gutters, so that no separate accumulator pit is required.

It is an object of the present invention to preserve the advantages of a vacuum system while combining vacuum operation with a filter medium which is improved as compared to diatomaceous earth.

Another object of the invention is to provide a vacuum pool filtration apparatus in which a single pump is utilized for both water recirculation and vacuum cleaning.

Another object of the invention is to provide a vacuum filtration apparatus for swimming pools in which the filter medium consists of disposable cartridges. It has been discovered that under a vacuum application, cartridge filters perform to several times as well as they do in a pressure application. The purpose of this system is to take advantage of this phenomenon.

In the system of the invention, water is supplied to the filter tank through a main drain line and also through a gutter grain line. These lines are below grade, and problems have been encountered in providing valves for such below grade lines because existing valves cannot be repaired and maintained without an excessive amount of effort and cost. Accordingly, another object of the invention is to provide improved valves for below grade lines for swimming pools, sewage plants, underwater lines, underground lines and the like.

A further and related object is to provide a valve for below grade applications in which the controls extend to ground level and consists of only one assembly of movable parts involving a rod, a clamp and a plug. An advantage of this construction is that much of the valve area is free and open for fluid to flow through it when the valve is opened, and yet the valve can be closed tight by manipulation of controls at ground level.

As previously mentioned, the invention involves a vacuum filter in which the filter medium consists of disposable cartridges. Although these cartridges are designed and intended to be disposed of when they become deteriorated to such an extent that they do not properly operate, there still may be advantages in cleaning the cartridges one or more times before they are disposed of. Cleaning such cartridges by merely squirting water on them is a very messy operation. Accordingly, it is another object of the invention to provide a filter tank with cartridges mounted so that they can be cleaned in place without discharge of waste material on the ground.

In the filter systems to be disclosed herein, the filter pump, controls, chemicals and related equipment are installed in a filter house which is separate from the pit where the filter itself is located. In known filter house installations, there have been problems with keeping chemicals and fumes away from valves, pumps and other equipment to prevent corrosion and damage to the equipment. Accordingly, it is an object of the invention to provide a filter equipment house in which chemicals are completely isolated from mechanical equipment eliminating danger from corrosive fumes and vapors. In a preferred embodiment, this is accomplished by providing crocks in the filter house which are vented to the outside and which are sealed by the lid of the filter house. The filter house is pre-engineered and pre-fabricated so that it can be installed on a site without requiring designing and site construction of valves and other peripheral equipment. The concept which employs completely pre-wired and pre-plumbed filter house, reduces the amount of field labor to install a filter system, and it also eliminates the employment of two separate construction trades by virtue of the fact that it is pre-wired and pre-plumbed no plumbers or electricians are needed to complete the installation of this system. The filter house is protected against flooding, is small and compact in design, and can be delivered easily to the swimming pool site.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

Figure 1:
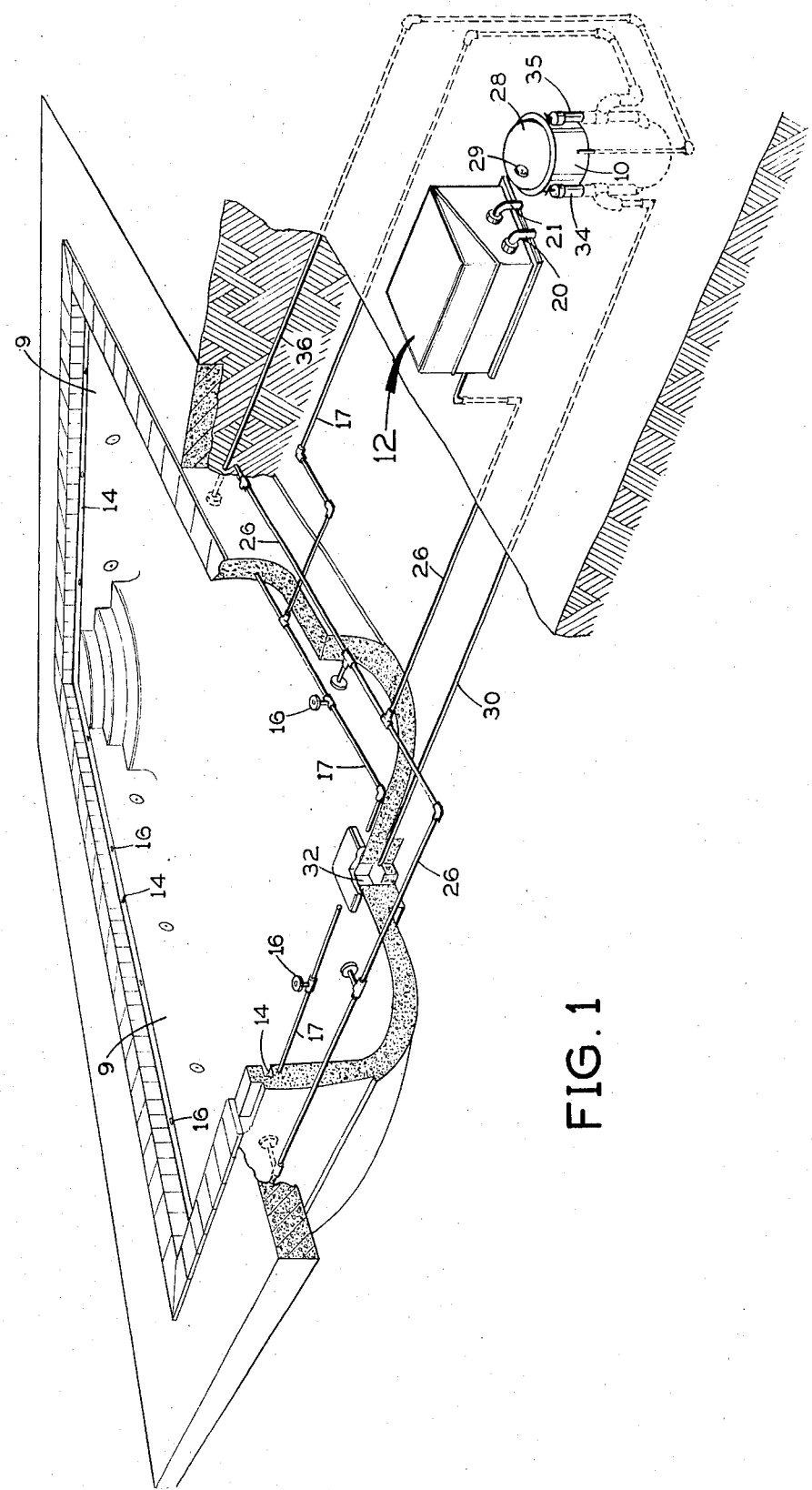
FIG. 1 is a schematic drawing showing a swimming pool provided with filter apparatus in accordance with one embodiment of the invention.

The filtration and cleaning system will be described with reference to the attached drawings beginning with FIG. 1. FIG. 1 is a schematic drawing of a swimming pool 9 having a filter tank 10 installed partly below grade, a filter equipment house installed above ground, and a system of piping through which water is recirculated from the pool through the filtration system and back to the pool.

On the side of the pool 9, there is a gutter 14 where inlets or drain fittings 16 are installed. Water flows by gravity into the filter tank 10 through line 17. It may be noted that instead of a gutter, a weir may be installed at the periphery of the pool to allow water to skim over the weir and flow from the weir to the filter tank.

Figure 6:
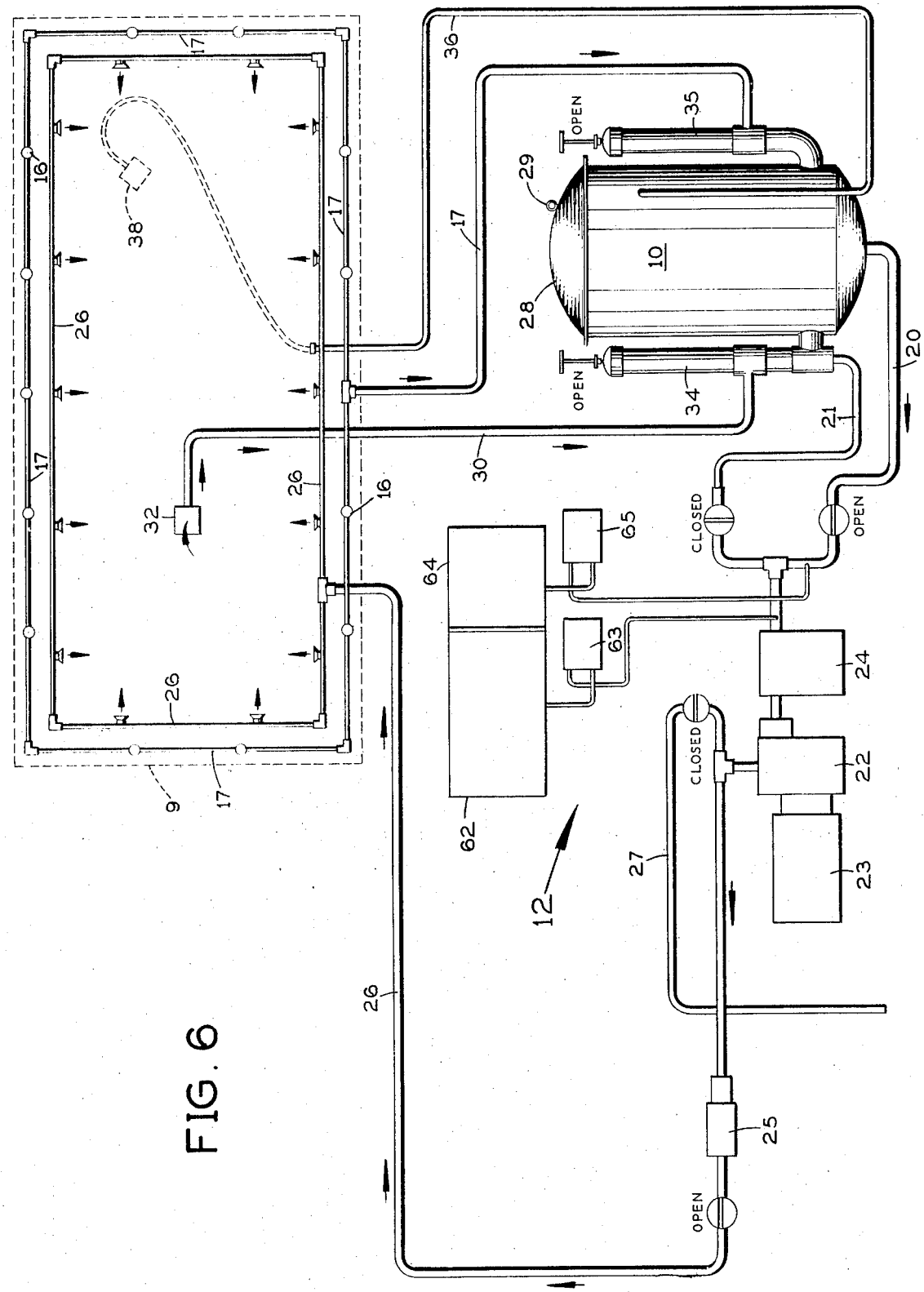
FIG. 6 is a schematic flow diagram for the apparatus when operating in a filtration mode.
Figure 7:
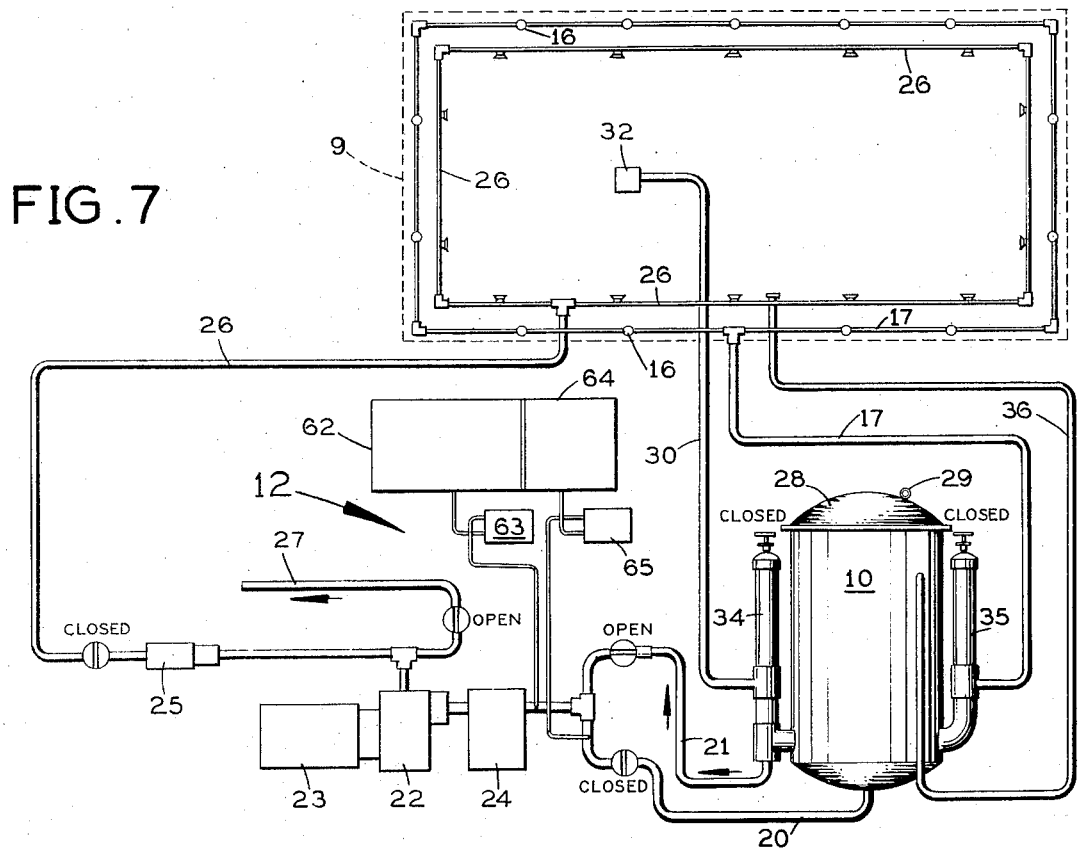
FIG. 7 is a schematic flow diagram for the apparatus when operating in a draining mode.

The static water level in the filter tank 10 is the same as in the pool 9. The filter operates on a gravity flow principle. Inside the filter, there are disposable cartridges 18 (FIG. 3) which constitute the filter medium. From the bottom of the filter tank, a line 20 leads from the filter to a recirculating pump 22 (FIGS. 2 and 6) in the filter equipment house 12. A hair and lint strainer 24 may be provided ahead of the recirculating pump 22 if desired. Water is drawn from the filter tank by the recirculating pump, which in turn causes water to flow by gravity from the pool into the filter tank. This water is drawn through the filter cartridges 18 down through the line 20 to the pump 22, and from the pump 22 the water is returned to the pool through flow meter 25 (this may be a flow controller) and return lines 26. (FIGS. 1 and 6). Chemicals are added by feeders 63 and 65. During this normal filtering operation, the lid 28 for the vacuum tank is in place, and the tank 10 is vented to the atmosphere through a small air cock and meter 29. It may be noted that water may also be drawn into the filter tank through the main drain line 30 which leads from the main drain 32 at the bottom of the pool to the filter tank 10.

Figure 8:
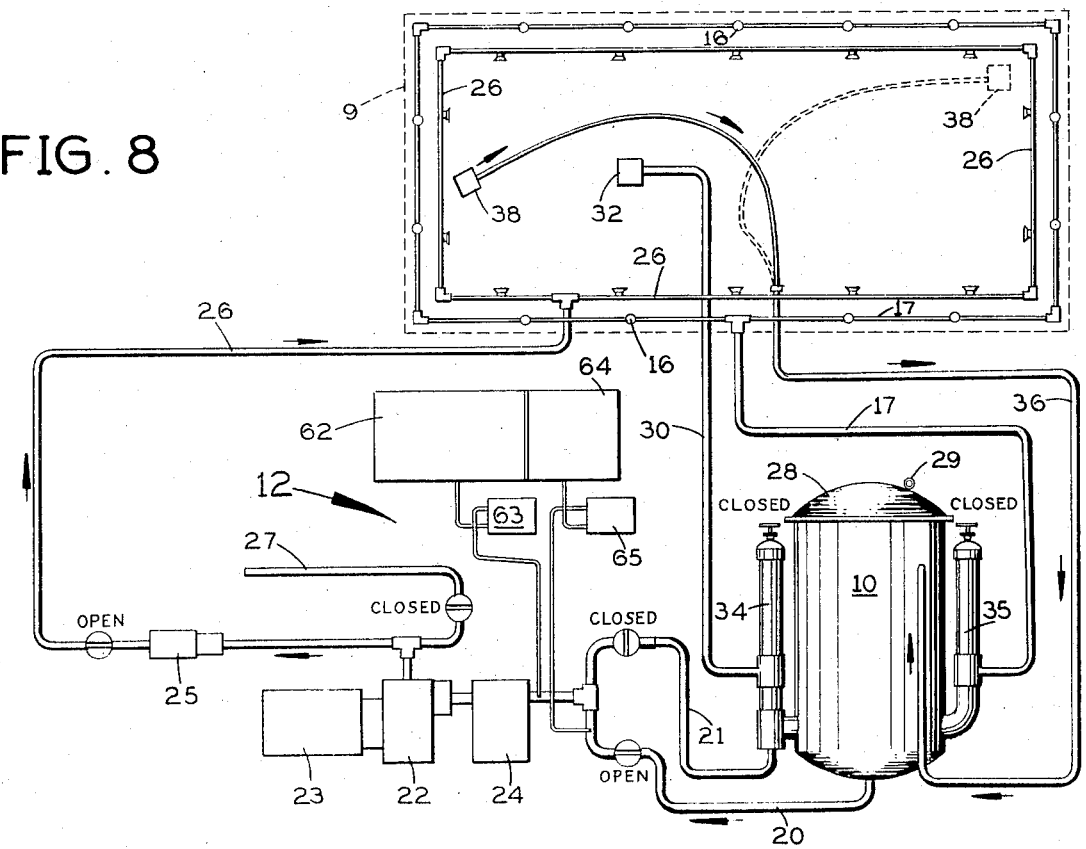
FIG. 8 is a schematic flow diagram for the apparatus when operating in a pool cleaning mode.

When it is necessary to vacuum the pool, the apparatus is placed in the condition shown in FIG. 8. The air cock 29 in the lid is closed, and the piping 30 from the pool is shut off by means of a special valve 34 which will be described in greater detail later. Where gutter lines 17 are provided, the gutter lines are also shut off by means of a like valve 35. Continued operation of the circulating pump reduces pressure in the tank 10 below atmospheric level, causing water to be drawn through the vacuum line 36 into the tank. The vacuum line 36 receives a flexible hose and a normal vacuum head 38 (FIG. 8) for cleaning the bottom of the pool.

After vacuuming, the air cock and the valves controlling the flow of water to and from the pool are returned to the normal filtering position (FIG. 6).

When the cartridges 18 become sufficiently loaded with dirt so as to reduce the flow of water through them to an unacceptable level, they may be cleaned. This is done with the cartridges in the normal position by the aid of a cleaning tool. During the cleaning operation, the suction from the pump is diverted to the upper chamber waste (drain) line by a simple re-arrangement of the valves on the suction side of the circulating pump as shown in FIG.. 7. The flow of water from the pool is cut off, thus causing the tank 10 to empty exposing the cartridges. Cleaning water and debris sluiced from the cartridges is withdrawn from the upper chamber through waste (drain) pipe 21 and is discharged through outlet 27. Whenever the filter cartridges become too clogged or deteriorated to permit further use, they are removed and replaced by fresh ones. The dirty cartridges may be thrown away.

A water level control with level sensing probes 40 (FIG. 3) is provided which controls the fresh water makeup valve (not shown in FIG. 1) located in the equipment house 12. This permits entry of makeup water into the system through inlet 41 (FIG.2) whenever the water level 43 (FIG.3) is below optimum operating conditions. The probe at the lowest level acts as a ground or neutral and is normally submerged. The middle probe acts to call for water makeup. The upper probe stops the demand for makeup water. All of the probes are connected by wires to an electrical control device (not shown) located in the equipment house.

The filter cartridges 18 are preferably constructed so that dirt does not penetrate too deeply into the cartridge. For this purpose, the cartridges may be of the type which have specially treated paper as the filter medium. Alternatively, good results have been achieved with cartridges made of spun fiberglass. In the latter cartridges, it appears that fine material penetrates to a certain extent into the fiberglass material, and this fine material prevents further penetration of material which then collects on the surface of the cartridge. It is possible to clean either the paper cartridge or the fiberglass cartridge by merely flushing the exterior of the cartridge.

Surprising results have been achieved using a vacuum type of system with filter cartridges of the type just described. The system will operate for very long times before cleaning is required. This greatly cuts down on the maintenance needed to keep the pool in proper operating condition, and also cuts down on the number of cartridges which are required for a given period of time. As previously mentioned, when the cartridges do become deteriorated to an extent which requires replacement, the dirty cartridges can be disposed of relatively easily. Since the cartridges last a long time, the cost of supplying replacement cartridges is minimal.

It should be noted that only one pump is required for both filtration and vacuuming of the pool. Also, no separate accumulator pit is required since the accumulating function is built into the filter tank. The filter employs low water velocities. The filter itself is below grade, but the equipment house may be above grade which precludes damage to that equipment by flooding. No heavily constructed housing is required for the filter tank, and there is no difficulty in removing a strongly secured lid from the top of a tank as is commonly required in pressure filter systems. Pressure systems also require a separate accumulator pit, which is not required with the vacuum cartridge system as previously mentioned. There is no problem of disposing of diatomaceous earth; the cartridges can be disposed of easily without violating anti-pollution regulations.

FILTER TANK AND EQUIPMENT HOUSE

Figure 2:
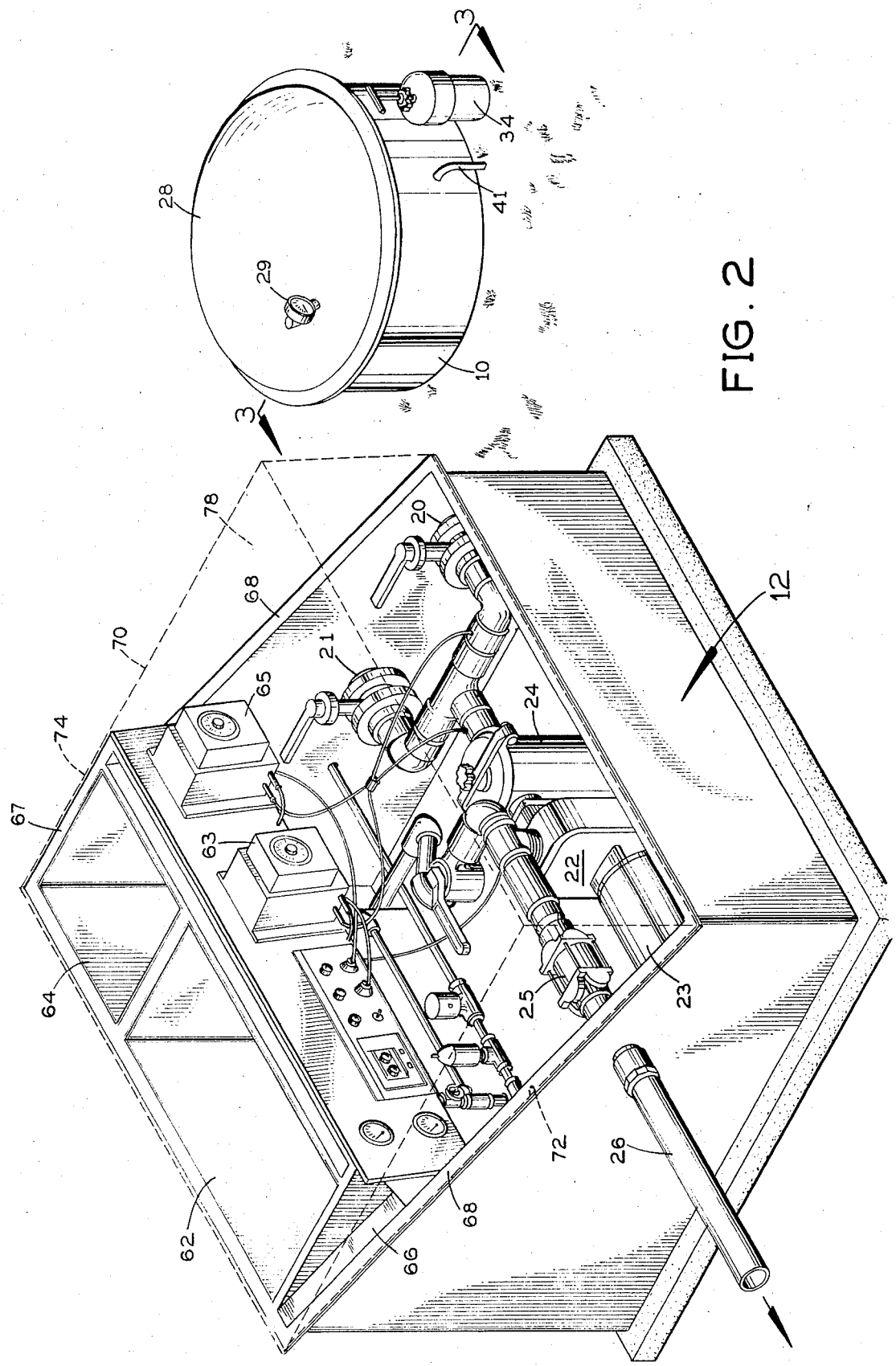
FIG. 2 is a perspective view of the equipment package and filter tank included in FIG. 1.
Figure 3:
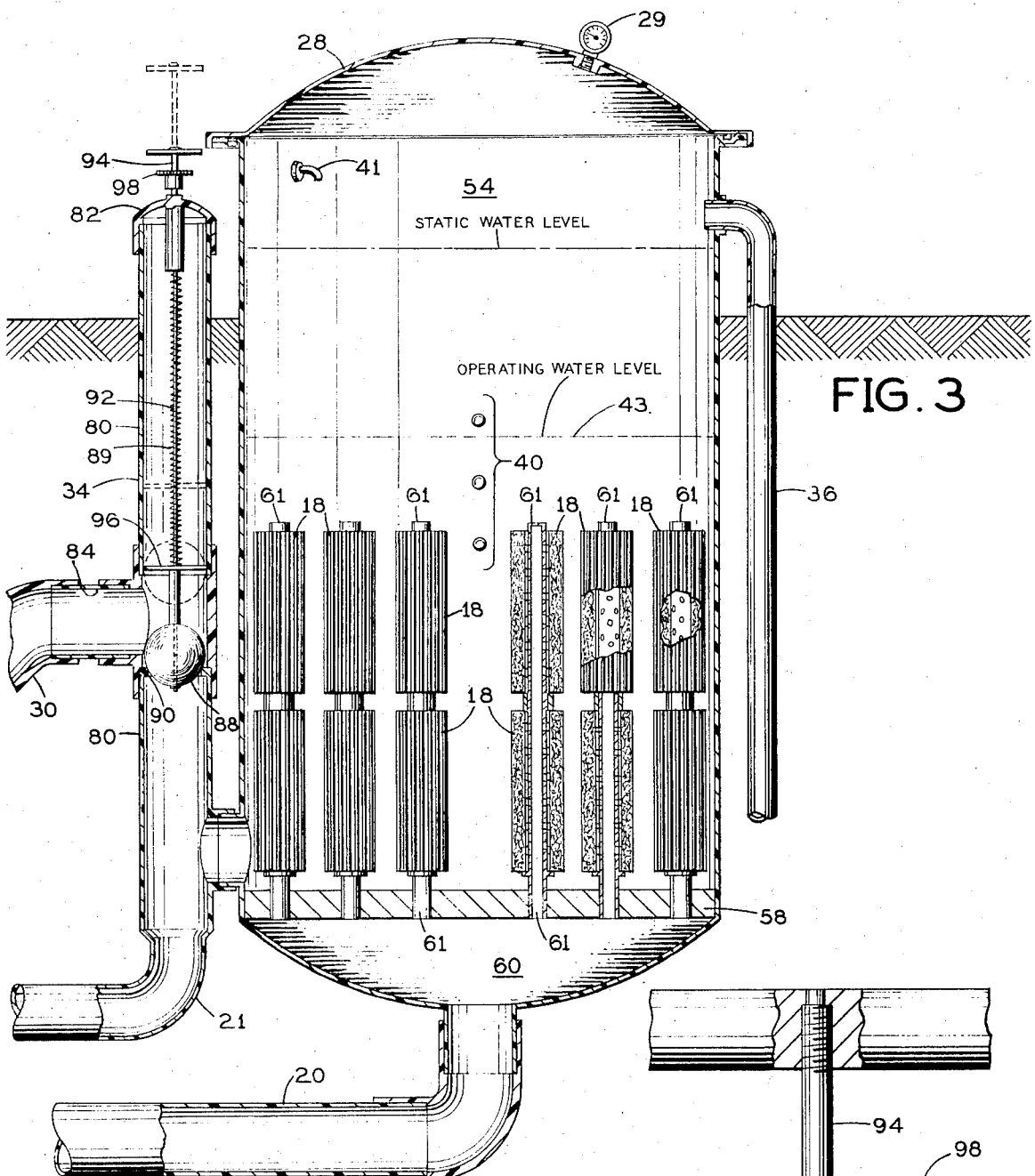
FIG. 3 is a sectional view of the filter tank taken along line 3—3 of FIG. 2 and looking in the direction of the arrows.
Figure 4:
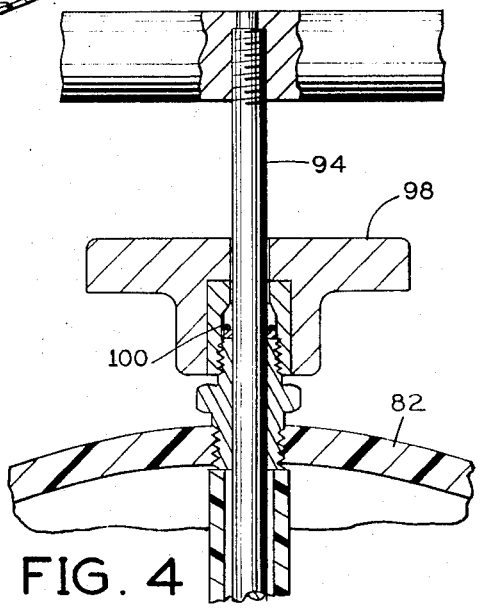
FIG. 4 is a sectional view of part of a valve included in the apparatus.
Figure 5:
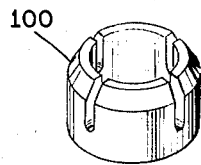
FIG. 5 is a perspective view of a compressible sleeve or gland included in the valve.

A suitable filter tank serving the function of the tank 10 in FIG. 1 is shown in detail in FIG. 3. The same reference numberal 10 is used for the tank in FIG. 2. It may be seen in FIG. 2 that the tank has a dome 28 with a pet cock 29 through which the tank is normally vented but which can be closed to seal the tank for vacuuming operations as previously described. The pet cock may include a meter.

The tank 10 has an upper chamber 54 for handling unfiltered water in which the filter elements 18 are mounted. A plate 58 divides the upper chamber from a lower chamber 60 for handling filtered water from which the line 20 leads. The filter plate 58 also serves as a mounting base for multiple collector pipes 61 which gives suppport to and picks up filtered water from the filter cartridges 18 and deliver the filtered water to the lower chamber. The main drain line 30 enters the tank 10 at its side, as does the gutter line 17. A waste line 21 may be provided as shown.

Referring particularly to FIG. 2, it may be seen that the equipment house 12 has two chemical crocks or containers 62 and 64 integrated into a main housing 66. The upper lip 67 of the crocks 62 and 64 is generally horizontal, but the flange of the housing 66 slants downwardly as at 68. The lid 70 for the housing has a downwardly slanting edge 72 which rests on the edge 68, and the flat top 74 of the lid rests on the upper mouth or lip around the crocks 62 and 64 to seal those crocks so that fumes cannot enter the space 78 inside the housing 12. The pump 22 and its motor 23 are provided inside the space 78 as shown particularly in FIG. 3 along with suitable piping and valves as indicated.

VALVE

A special valve 34 is shown in FIG. 3. This valve has a tubular housing 80 which is sealed at the top by a cover 82, and which has an inlet extension 84 connected to the piping 30. This inlet leads into the side of the vertical tube 80.

Inside the valve, there is a ball plug 88. This ball plug may be made of polyethylene or some other material which is not attacked by chemicals. The plug 88 may have a shape other than spherical. The plug 88 seats on a ring 90 located on the inside of tube 80 below the inlet 84. A rod 92 leads from the plug 88 up through the cover 82, and the upper end 94 of this rod can be manipulated to raise and lower the plug, and thus open and close the valve. The plug 88 is normally biased downward by a spring 89. The rod 92 may have a spider 96 on it which loosely fits inside the tube 80 and serves to guide the vertical movement of the rod 92 and plug 88. Means may be provided to hold the rod 92 in a raised position, and in the illustrated embodiment, this means consists of a hand wheel 98 which bears against a packing gland or clamp 100 having frictional engagement with the rod 94. When the handwheel 98 is turned down tight, it compresses the packing gland 100 which in turn applies pressure to the rod 94 to hold it wherever the rod is set.

An advantage of this valve is that the tube 80 and the rod 92 may be made as long as desired. Thus, the ball plug may be located a long distance below ground level, and yet the handle 94 and wheel 98 may be located above ground level where they are readily accessible to be manipulated by an operator. Another advantage is that when the valve is open, the ball plug 88 is raised above the inlet 84, so almost the full area of the valve is unrestricted and open for flow of liquid through the valve. In other words, the ball plug 88 is raised out of the path of the liquid when the valve is open. Still another advantage is that all parts that would normally be replaced are attached to the control rod 92 which can be removed easily merely by taking off the cover 82. Thus, it would be possible to replace the ball plug 88 if it should become worn. The valve can be constructed entirely of non-corrosive materials with high resistance to most chemicals.

Having thus described our invention, we claim:

1. In a filtration apparatus for a below grade swimming pool in which water from the pool is sucked under partial vacuum by a pump through a filter medium and returned to the pool, the improvements comprising in combination:

a below grade filter tank having horizontal plate means therein dividing its interior into an upper chamber above said plate means and a lower chamber below said plate means, said plate means having a plurality of apertures therein;

at least one water line means extending from the pool to said upper chamber for supplying water from the pool to said upper chamber by gravity flow and for maintaining a static water level in said upper chamber at the water level in the pool;

a plurality of apertured pipes having lower portions supported by said plate means in alignment respectively with said apertures of said plate means, said pipes extending vertically up from said plate means into said upper chamber for receiving filter cartridges therein and opening at said lower portions into said lower chamber for discharging filtered water into said lower chamber;

porous, cylindrical, hollow filter cartridges mounted respectively on the outside of said pipes in said upper chamber, with said pipes received in the hollow interiors of said cartridges and each cartridge being removable upwardly in the upper chamber from the corresponding pipe;

a removable lid for said tank providing access to said filter cartridges in said upper chamber for cleaning and replacement thereof;

a waste line draining from a portion of said upper chamber in said tank immediately above said horizontal plate means and below said filter cartridges for removing water from said upper chamber without passing through said filter cartridges to expose said filter cartridges for cleaning thereof in said tank;

a return line leading from said lower chamber of said tank back to the pool;

and a pump means in said return line for drawing water from said upper chamber through said filter cartridges from outside to inside thereof under partial vacuum and into and down through said apertured pipes and down through said lower chamber of said tank back to the pool for filtering the water with contaminants being deposited on the outside of said filter cartridges from which the contaminants may be removed by cleaning said cartridges in said upper chamber after removing water therefrom and removing said lid;

said pump means also being connected to said waste line and arranged to pump waste water and contaminants through said waste line from the tank above said plate means external to said filter cartridges to a drain.

2. The filter apparatus as claimed in claim 1 including a separate house enclosing said pump means and having an open-topped chemical storage bin therein, said house having a vertically swingable lid normally closing the open top of said storage bin for opening and closing said house and simultaneously opening and closing said chemical storage bin from above, said filter apparatus house completely wired with electrical leads terminating in a junction box outside the house, and completely piped with fresh water supply terminus outside the house.

3. A filtration apparatus according to claim 1, and further comprising means for attaching a pool vacuum hose to one of said water lines extending to said upper section of the filter tank, whereby said pump effects vacuuming of the pool when the vacuum hose is attached.

4. A filtration apparatus according to claim 2, and further comprising:

a tubular housing at least partly below grade extending vertically alongside said filter tank and having a fluid connection to the interior of the filter tank immediately above said partition, means defining an upwardly-facing annular valve seat in said housing below grade and above said fluid connection, said housing being connected to one of said water lines above said valve seat;

an elongated rod extending down through said tubular housing a plug on the lower end of said rod and below grade sealingly engageable with said valve seat to block the flow of water from said one water line down to said fluid connection into the interior of the filter tank;

spring means biasing said rod downward to seal said plug against said valve seat;

a handle on the upper end of said rod above said tubular housing and above grade for raising said plug away from said seat and up past the connection of said housing to said one water line;

and means above grade acting between said rod and said housing for releasably locking said rod in a raised position.

* * * * *